Sept. 13, 1955     J. F. NENZELL     2,717,793
FLUID SEAL AND APPARATUS FOR MANUFACTURE THEREOF
Filed Nov. 10, 1952
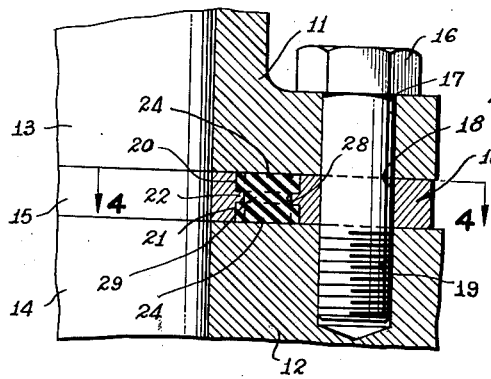
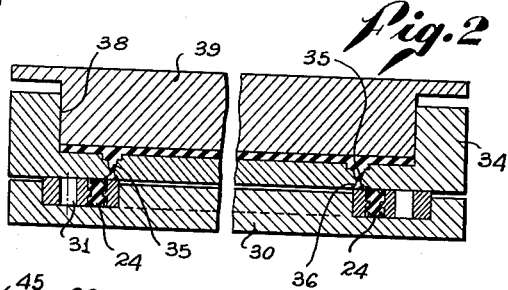
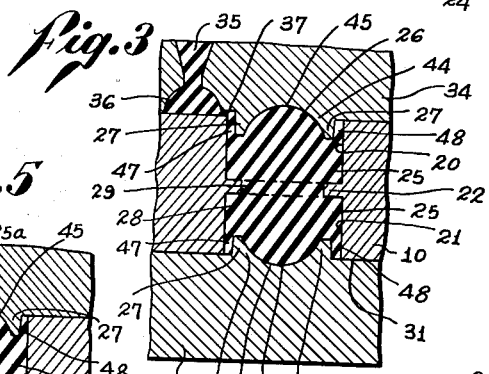
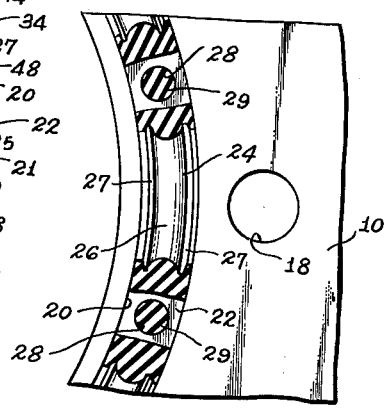
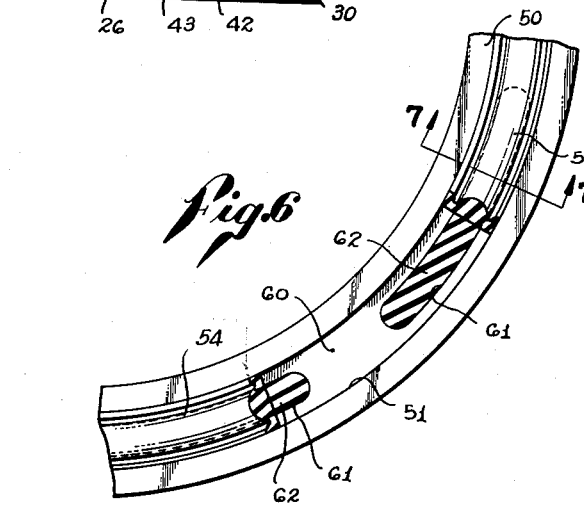
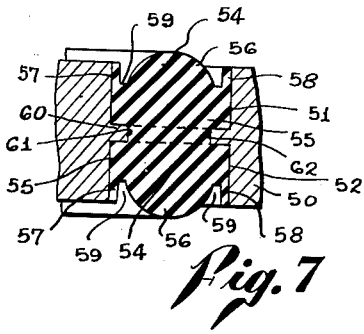
INVENTOR.
JOSEPH F. NENZELL
BY Fulwider & Mattingly
Attorneys

United States Patent Office 2,717,793
Patented Sept. 13, 1955

2,717,793

FLUID SEAL AND APPARATUS FOR MANUFACTURE THEREOF

Joseph F. Nenzell, Los Angeles, Calif., assignor to The Mathewson Corporation, Inglewood, Calif.

Application November 19, 1952, Serial No. 319,697

11 Claims. (Cl. 288—25)

This invention relates generally to sealing means, and more particularly to an improved seal adapted for use at joints formed by opposed mating parts. Further, the invention relates to an improved method and apparatus for manufacturing such seals to achieve accurate volumetric relationships between the component elements.

Embodiments of the invention may be provided for use in many different installations such as the joinder of housing parts, the connection of flanged members, or elsewhere in which there is an edge sealing problem. To provide such an edge seal between the opposed faces of mating parts it is customary to insert a layer of deformable packing material which is compressed by drawing the parts together. This type of packing is subject to rapid deterioration, cannot be reused after disassembly of the parts, and is completely inadequate to withstand high pressures. Consequently, many complex types of coupling joints have been proposed. These are generally expensive, bulky, and unsuited to the majority of installations. In contrast, the seal I provide is quite simple and can be installed without difficulty in either large or small mechanisms. It gives exceptionally long service and will seal properly even under extremely high pressures.

A preferred embodiment of the present seal comprises a relatively rigid retaining body having retaining grooves on opposed outer surfaces thereof fitted with resilient deformable packing members which are sectionally profiled to form a central projection extending beyond the surface of the retaining body, and open side channels lying within the retaining grooves. The retaining body and the packing members are normally continuous or endless and shaped to the periphery of the mating parts, so that as these parts are drawn together the packing members are compressed within the retaining grooves and make endless lines of sealing contact with the corresponding faces of the opposed parts.

By the use of the rigid retaining body, the packing members are confined and cannot blow out even under very high pressures. Because of the outer profile of the packing members they are adapted to deform under pressure to seal in a manner similar to the well known O-rings. Since the seal is effected between the packing members and the faced parts it is not necessary to have an overall area of contact between the parts and the retaining body, the machining or casting tolerances of the parts therefore may be quite large. Additionally, the packing members are not permanently deformed in use and may be reused many times.

It should be pointed out that while the sealing function of my packing members is generally similar to that of an O-ring of circular cross-section confined within a retaining groove, such rings cannot be properly used in this type of seal. Upon initial compression of the O-ring, air pockets are formed in the bottom corners of the retaining grooves wherein air is entrapped under high pressure, forcing the ring to extrude between the retaining body and the opposed part so that it does not seal effectively. Subsequently this air bleeds off slowly, causing further deformation of the ring that permits fluid leakage and releases the torque on the take-up bolts or other fastening means securing the mating parts. This latter problem is very important in mechanisms subjected to vibration and shock, and may cause a complete breakdown.

It will therefore be understood that the packing member should be capable of being compressed entirely within the retaining groove and have a total volume which is less than the volume of the groove so that it cannot be extruded to overflow the groove. To achieve this volumetric relationship, it is necessary that the volume of the packing member projecting beyond the surface of the retaining body be slightly less than the volume of the void space within the groove not filled by the packing member. I have therefore provided a novel method and apparatus for molding the packing members within the retaining body which maintains a constant relationship between the volume of the aforementioned groove void and projecting portion, regardless of variations in the total volume of the groove. In other words, each packing member is molded into its particular retaining groove, and variations in the depth and width of the groove or in the thickness of the body, cannot affect the accuracy of the volumetric relationship.

A further problem encountered in devices of this character is to provide a seal in which the packing members are securely held within the retaining body so that the entire device may be installed as a unit. Cementation of the packing material to the retainer body is not positive nor satisfactory from a production standpoint. I have overcome this difficulty by the provision of spaced connectors which bond the packing members to each other and at the same time against relative movement within the retaining body. This construction is accomplished quite simply by the use of cooperating molds designed to simultaneously form both of the packing members as an integral unit. By the use of the packing member connectors, I also permit cold flow of the packing material during the use of the device. This tends to overcome the effect of adverse tolerances in the faces of the mating parts by permitting packing material to flow between the retaining grooves.

With the foregoing in mind it is a major object of my invention to provide an improved seal having resilient deformable packing members mounted within a relatively rigid retaining body.

It is also an object of this invention to provide a seal of the character described in which the cross-sectional shape of the packing members is such as to prevent air entrapment and provide optimum sealing qualities.

A further object of the invention is to provide a method and apparatus for forming a seal having opposed packing members and their retaining grooves are correctly maintained regardless of variations in the groove dimensions or the thickness of the retaining body.

It is another object of the invention to provide a seal of the character described in which the packing members are formed with side fillets to assist in achieving the proper volumetric relationship.

An additional object of the invention is to provide a seal in which opposed packing members are bonded to each other by spaced connector means and against movement within a retaining body, in such a manner that the packing material may flow between the packing members.

It is still another object of the invention to provide mold apparatus for forming packing members within a retaining body which permits economical and rapid production.

It is a still further object of the invention to provide side fillets on the packing members which serve to prevent the formation of air pockets along the upper sections of the groove walls.

Yet another object of the invention is to provide side fillets on the packing members which form supplemental lines of sealing contact with an opposed cooperating surface.

A further object of my invention is to provide side fillets on the packing members which serve to prevent extrusion of the main central projecting portion of the packing members.

These and other objects and advantages of my invention will become apparent from the following detailed description of a preferred and a modified embodiment of the device and apparatus for manufacturing the same, and from an inspection of the accompanying drawings, in which:

Figure 1 is a partial cross-section taken through a typical joint showing a preferred embodiment of my seal installed therein;

Figure 2 is a cross-sectional view through cooperating molds showing the method of forming the packing members within the retaining body;

Figure 3 is an enlarged sectional detail of the molding dies and seal;

Figure 4 is a partial plan view of the seal taken along the line 4—4 of Figure 1, but showing the upper packing member in uncompressed state and broken away on angular sections adjacent web openings;

Figure 5 is an enlarged sectional detail of an alternate form of molding die;

Figure 6 is a partial plan view of a modified form of seal showing the upper packing member broken away across slotted connector openings; and Figure 7 is a cross-sectional view taken along the line 7—7 of Figure 6.

Referring now to the drawings, and particularly to Figure 1 thereof, the numeral 10 designates generally a retaining body for a preferred embodiment of the seal. Body 10 is formed of rigid metal and is adapted to fit between opposed mating parts. As illustrated, body 10 is typically formed as a flat plate to fit between opposed upper and lower faced parts 11 and 12, respectively. Parts 11 and 12 may be formed with interior chambers 13 and 14, respectively, that are communicated with each other through a corresponding opening 15 defined within body 10. The shape of body 10 is such as to conform to the peripheral or marginal border of the faced parts 11 and 12, and as can be understood, this shape may be circular, oval, rectangular, or irregular, depending upon the configuration of the parts in the particular installation. In any event, body 10 forms an endless or continuous band of material which is rim-like in nature. In order to draw parts 11 and 12 together, suitable fastening means such as take-up bolts 16 are spaced about the periphery of the parts. Bolts 16 may typically pass through an opening 17 in upper part 11, corresponding openings 18 formed within body 10, and terminally engage within threaded sockets 19 formed in lower part 12. As these bolts are drawn up, the faced portions of parts 11 and 12 are forced tightly against body 10.

In the upper and lower surfaces of body 10 are formed continuous retainer grooves 20 and 21, respectively, which are of rectilinear cross-section and are preferably located in back-to-back relationship. Between grooves 20 and 21 is formed a resilient deformable packing member 24 which is adapted to seal tightly against the faces of parts 11 and 12. Packing members 24 may be formed of any suitable material, but are preferably made of a synthetic rubber having a high compression resilience.

The cross-sectional shape of members 24 is of greatest importance and may best be seen in Fig. 3. The bottom portion of each member 24 is a solid rectangular block 25 which completely fills the bottom corners of grooves 20 and 21. This prevents any air entrapment within the bottom corners of grooves 20 and 21, and avoids any subsequent breakdown of the seal or loosening of the joint due to gradual leakage of the entrapped air.

Formed integrally with the bottom portion 25 is a raised central projection 26 which is of rounded cross-section and extends outwardly beyond the adjacent faces of body 10 in its normal uncompressed position. As can be understood, the shape of central projection 26 defines side channels or void spaces 27 which lie at both sides of the central projection and within the respective grooves 20 and 21.

When parts 11 and 12 are pressed inwardly against retainer body 10, projection 26 is forced to yield or deform resiliently and is flattened downwardly within channel 27 into the position shown in Fig. 1. For this purpose it is necessary that the volume of projection 26 lying outside of the grooves 20 and 21 be equal to or less than the total volume of the channels 27. Therefore, it can be seen that the volumetric relationship between the groove and the packing member is of critical importance, and as will hereinafter be described, I am able to control this volumetric relationship by a method and apparatus for molding the packing members directly into the retaining grooves 20 and 21.

In order to hold packing members 24 securely within retaining grooves 20 and 21, spaced connector means are provided for interlocking the opposed packing members to each other. As is best seen in Figs. 1 and 4, the web 22 between the bottom walls of grooves 20 and 21 is provided with openings 28 spaced along the length thereof to communicate the grooves with each other. Extending through openings 28 are connectors 29 which are formed integrally with packing members 24 in the molding operations. The connectors 29 are formed to fill the openings 28, and in this embodiment are of cylindrical shape. Through the use of connectors 29, packing members 24 are attached to each other and against relative movement within grooves 20 and 21. The openings 28 serve an additional function in permitting the cold flow of packing material between the packing members 24. Under conditions in which members 11 and 12 are not properly faced, the force exerted against one of the packing members 24 or a portion thereof may be considerably in excess of the force exerted against the other packing member. Since cold flow of the packing material may take place through openings 28, the resulting change in the volume of the packing members tends to prevent any pressure unbalance from being exerted on the packing members.

In order to provide packing members 24 of the character described, I provide molding apparatus shown in one simplified form in Figs. 2 and 3. While I have illustrated a compression type molding apparatus, it will be understood that this is merely for the purpose of disclosing the principles of the method. As shown, a lower die or mold 30 has a cavity 31 on the top face thereof shaped to receive the retainer body 10. The cavity 31 is slightly less deep than the body so that the latter projects above the mold 30 a slight distance for engagement with an upper mold 34. To one side of retaining groove 20 is a plurality of spaced sprue openings 35 cut through mold 34 to admit the packing material in a plastic state into a side overflow or flash groove 36 which extends around the entire length of the retaining groove and is communicated thereto by a small right-angular undercut slot 37 that opens into the upper corner of the groove, as is best seen in Fig. 3. Plastic packing material which is admitted into groove 20 fills this groove and also flows through web openings 28 to fill the lower retaining groove 21. The main portion of the lower face of mold 34 is generally flat and seats downwardly against the upper surface of body 10, while the main portion of mold 30 similarly seats against the bottom surface of the body.

In order to apply pressure to the plastic packing material, the top portion of upper mold 34 may be typically formed as an enlarged recessed cylindrical opening 38 which slidably receives a plunger 39. The bottom portion of opening 38 is filled with a quantity of packing material in a plastic state, and pressure is then applied to plunger 39 to force the material downwardly through sprues 35, overflow groove 36, slot 37, and thence into the retaining grooves 20 and 21. This describes in general the formation of packing members 24. However, to shape the cross-sectional profile of the packing members and to achieve the proper volumetric relationship between the packing members and the retaining grooves 20 and 21, the molds 29 and 34 are formed with raised projecting dies which seat directly within the grooves, as is best seen in the detail of Fig. 3.

The bottom mold 30 has a raised die 42 which projects upwardly from the bottom of cavity 31 and is shaped with parallel sides that are designed to enter within the side walls of groove 21 in spaced relationship. The top surface of die 42 is concave along a rounded surface 43 so as to form the projection 26. A similar raised die 44 projects downwardly from upper mold 34 and enters within upper groove 20. This die is provided with a concave rounded surface 45 for forming the projection 26 of the upper packing member 24. The previously-mentioned slot 37 enters along the side of die 44 for admitting packing material into the groove.

The side sections of dies 42 and 44 extend down within the grooves 20 and 21 and form channels 27 which extend along either side of the projection 26. As will be remembered, it is important that the total volume of channels 27 be substantially equal to the volume of the projection 26 which lies outside of the grooves and beyond the surface of body 10. This result is accomplished regardless of the variations in the depth and width of grooves 20 and 21, or the thickness of body 10, because of the particular nature of dies 42 and 44.

First, it should be noted that the depth of penetration of dies 42 and 44 into grooves 20 and 21 is limited by the engagement of the mold faces upon the opposite surfaces of body 10. Thus the position of projection 26 and channels 27 relative to the top of the grooves remains unchanged though the depth of the groove varies. In other words, if grooves 20 and 21 are either less than or greater than the correct depth due to manufacturing tolerances, the only change in packing members 24 will be that the bottom portions 25 will either be of less or greater thickness. The shape and position of projection 26 and channels 27 will not be affected, and consequently there will be no variations in the aforementioned volumetric relationship between the projection and the channels. By the same token, it can be understood that variations in the thickness of body 10 have no effect upon the character of packing members 24 or its volumetric relationship to the retaining grooves 20 and 21.

Second, the width of dies 42 and 44 is made less than the minimum tolerable width of grooves 20 and 21 so that they fit therein with substantial side clearance. When the packing material is flowed into grooves 20 and 21, this results in the formation of side spacer pieces or fillets 47 and 48 which are integral with packing member 24, and lie adjacent the side walls of the grooves 20 and 21. After the packing members have become set, the flash formed in the slot 37 is trimmed so that the tops of both fillets 47 and 48 terminate flush with the tops of the grooves. In the event that grooves 20 and 21 are wider than the correct width, the only change in the packing member 24 will be to increase the width of fillets 47 and 48. Consequently, there will be no variation in the desired volumetric relationship between projection 26 and channels 27.

Fillets 47 and 48 also serve supplemental functions avoiding the entrapment of air within the upper portion of grooves 20 and 21 upon deformation of the packing members, and in creating secondary lines of sealing contact. When projection 26 is flattened downwardly by contact with the parts 11 and 12, it is pressed outwardly toward the side wall of its retaining groove. The pressure at the top of projection 26 may be somewhat greater than at a lower portion, tending to create an air pocket if it is forced against the unyielding surface of a groove wall. However, by the use of the construction described, projection 26 is not forced against the walls of grooves 20 and 21, but against the yieldable inner side surface of fillets 47 and 48. Consequently the fillets 47 and 48 may be deformed to assume a shape complemental to that of projection 26 and prevent the formation of air pockets. As can also be appreciated, when the fillets 47 and 48 are forced to deform by the central projection 26 they tend to protrude upwardly above the top of grooves 20 and 21 to form secondary lines of sealing contact with the opposing faced parts. In the event that the volume of packing members 24 should exceed that of retainer grooves 20 and 21, the fillets 47 and 48 will be extruded outwardly between body 10 and the opposed parts 11 and 12 before any extrusion of projection 26 can take place. Thus fillets 47 and 48 also function as anti-extrusion means preventing damage to the main sealing projection 26.

When the packing material is flowed into the upper groove 20 through sprues 35, it is under sufficient pressure so that it will fill the entire void defined between molds 30 and 34 and retainer body 10. Thus the material flows through web openings 28, filling the lower groove 21 to form the lower packing member 24 as well as the upper packing member. The material remaining within openings 28 forms the connectors 29 integral with both of the packing members 24 and thus secures the packing members to each other and against movement within body 10.

In Figure 5 I have illustrated a sectional detail of an alternate form of upper mold 34a which is generally similar to mold 34, and may be used with the same lower mold 30. In this case, sprues 35a lie centrally above grooves 20 and open thereinto through the concave central section 45 of the upper raised die surface 44. This results in a flash along the top of projection 26 which is trimmed off in the conventional manner, so that the finished shape of the upper packing member 24 is not changed. Other modifications of the molding structure can, of course, be provided without departing from the principles set forth.

A modified form of the seal which is generally similar in principle but differs somewhat in construction is seen in Figures 6 and 7. A retaining body 50 has upper and lower retaining grooves 51 and 52, respectively. In this design, body 50 has no locking openings and is merely held in place by frictional engagement of opposing faced parts, or by other means not shown. Each of the grooves 51 and 52 carries a resilient packing member 54 which is formed in the same manner as the preferred packing member, and has a generally similar cross-sectional profile, as is seen in Figure 7. A central projection 56 is joined integrally to a bottom portion 55, and side fillets 57 and 58 are likewise provided. The volumetric relationship of the central section 56 to side channels 59 lying adjacent thereto and within grooves 51 and 52 is held constant by using the same method and apparatus for molding the packing members as in the preferred form, and need not again be described.

However, in this form of the device a central web 60 formed between the bottom walls of grooves 51 and 52 is provided with spaced elongated openings 61, as is seen in Figure 6. Openings 61 may be typically provided with concentric arcuate side walls and rounded end portions for use in a design in which grooves 51 and 52 are of annular shape. The exact configuration of openings 61 will, of course, vary in accordance with the shape of body 50 as dictated by the particular installation.

In the molding operation, openings 61 are filled with packing material to form connectors 62 which secure packing members 54 to each other. Connectors 62 completely fill openings 61, and because of their elongation, provide a strong bond between the packing members 54. Also, the relatively great sectional area of connectors 62 facilitates the cold flow of material between packing members 54.

While I have thus shown and described preferred and modified forms of the seal and the apparatus and methods for forming the same, it will be understood that changes of design and construction of the seals and of the manufacture thereof will be apparent to those skilled in the art. Therefore I do not wish to be limited to the details herein described, except as defined in the appended claims.

I claim:

1. A seal for use against a faced part which comprises: a retainer body having a flat part-engaging surface, said surface being provided with a longitudinal groove; a resilient packing member molded in said groove with a bottom portion filling the bottom of said groove and having walls precisely congruent with the walls of said groove, and an outer central projection extending beyond the surface of said body for engagement with said part, said member having channels therein on the sides of said central projection and lying within said groove, and having a total volume substantially as great as the volume of the central projection which lies beyond said body surface, whereby said member may be confined within said groove when said part is drawn against said body; and means formed integrally with said member and projecting inwardly for interlocking engagement with said body.

2. A seal for use in a joint between opposed mating parts which comprises: a retainer body having substantially opposed flat part-engaging surfaces, said surfaces being provided with grooves separated by a central body web having spaced along the length thereof a plurality of openings interconnecting said grooves; a resilient packing member molded in each of said grooves with a bottom portion filling the bottom of said groove and having walls precisely congruent with the walls of said groove, and an outer central projection extending beyond the surface of said body for engagement with one of said parts, said member having channels therein on both sides of said central projection and lying within said groove, and having a total volume substantially as great as the volume of the central projection which lies beyond said body surface whereby said member may be confined within said groove when said parts are drawn against said body; and connectors extending through the openings in said web and formed integrally with said members to secure said members to each other and against movement within said body.

3. A seal for use against a faced part which comprises: a rigid body having a flat part-engaging surface, said surface being provided with a longitudinal groove; and a resilient deformable packing member molded in said groove with a bottom portion filling the bottom of said groove and having walls precisely congruent with the walls of said groove, and an integral outer portion divided into side fillets abutting the sides of said groove and a central projection extending beyond the surface of said body for engagement with said part, said fillets and said central projection defining channels in said member lying on both sides of said central projection and within said groove, and having a total volume substantially equal to the volume of the central projection which lies beyond said body surface whereby said member may be confined within said groove when said part is drawn against said body.

4. A seal for use in a joint between opposed mating parts which comprises: a retainer body having substantially opposed flat part-engaging surfaces, said surfaces being provided with grooves separated by a central body web having spaced along the length thereof a plurality of openings interconnecting said grooves; a resilient packing member molded in each of said grooves and having walls precisely congruent with the walls of said groove, with a bottom portion filling the bottom of said groove and an integral outer portion divided into side fillets abutting the sides of said groove and a central projection extending beyond the surface of said body for engagement with one of said parts, said fillets and said central projection defining channels in said member lying on both sides of said central projection and within said groove, and having a total volume substantially equal to the volume of the central projection which lies beyond said body surface whereby said member may be confined within said groove when said parts are drawn tightly against said body; and connectors extending through the openings in said web and formed integrally with said members to secure said members to each other and against movement within said body.

5. A seal for use in a joint between opposed mating parts which comprises: a rigid body having substantially opposed part-engaging surfaces, said surfaces being provided with continuous grooves of generally rectilinear cross section, said grooves being separated by a central body web having spaced along the length thereof a plurality of openings interconnecting said grooves; a resilient deformable packing member molded in each of said grooves and having walls precisely congruent with the walls of said groove, with an outer portion divided into side fillets abutting the sides of said groove and a central projection extending beyond the surface of said body for engagement with one of said parts, said fillets and said central projection defining continuous channels in said member lying on both sides of said central projection and within said groove, said outer portion being fixed in relationship to said body surface with said channels having a total volume as great as the volume of the central projection which lies beyond said body surface whereby said member may be confined wholly within said groove when said parts are drawn tightly against said body, and an integral bottom portion of sufficient depth to completely fill the bottom of said groove; and connectors extending through the openings in said web and formed integrally with said members to secure said members to each other and against movement within said body.

6. The seal as defined in claim 3 further characterized in that the central projection of said member is of rounded cross section.

7. The seal as defined in claim 5 further characterized in that the central projection of said member is of semi-circular cross section.

8. A seal for use in a joint between opposed planar faced parts which comprises: a rigid body having opposed substantially parallel part-engaging surfaces, said surfaces being provided with continuous grooves of generally rectilinear cross section in back-to-back relationship and of approximate depth and width, said grooves being separated by a central body web having spaced along the length thereof a plurality of circular openings interconnecting said grooves; a resilient deformable packing member molded in each of said grooves and having walls precisely congruent with the walls of said groove, with an outer portion divided into straight-walled side fillets lying adjacent the sides of said groove and a central projection of rounded cross section extending beyond the surface of said body for engagement with one of said faced parts, said fillets and said central projection defining continuous channels in said member lying on both sides of said central projection and within said groove, the total volume of said channels being as great as the volume of the central projection which lies beyond said body surface whereby said member may be confined wholly within said groove when said faced parts are drawn tightly against said body, and an integral bottom portion completely filling the bottom of said groove; and connectors extending through the openings in said web and formed integrally with said members to secure said members to each other, said connectors being shaped to fill said openings to prevent lengthwise movement of said members within said body.

9. A seal for use in a joint between opposed faced parts which comprises: a rigid body having opposed substantially parallel part-engaging surfaces, said surfaces being provided with continuous grooves of generally rectilinear cross section in back-to-back relationship and of approximate depth and width, said grooves being separated by a central web having spaced along the length thereof a plurality of elongated slots interconnecting said grooves; a resilient packing member molded in each of said grooves and having walls precisely congruent with the walls of said groove, with an outer portion divided into straight-walled side fillets lying adjacent the sides of said groove and a central projection of semi-circular cross section extending beyond the surface of said body for engagement with one of said faced parts, said fillets and said central projection defining continuous channels in said member lying on both sides of said central projection and within said groove, the total volume of said channels being as great as the volume of the central projection which lies beyond said body surface whereby said members may be confined wholly within said groove when said faced parts are drawn tightly against said body, and an integral bottom portion completely filling the bottom of said groove; and connectors extending through the slots in said web and formed integrally with said members to secure said members to each other, said connectors being shaped to fill said slots to prevent lengthwise movement of said members within said body.

10. Apparatus for forming a resilient deformable packing member in a grooved body to have an engaging portion extending beyond the part-engaging surface of said body but deformable within said body, which comprises: a holder for holding said body rigidly in place with the grooved surface thereof exposed; a die having a supporting face and a forming face, said forming face having spaced side sections extending outwardly of the plane of said supporting face and a central concave recess extending inwardly of said plane, said side sections having a volume disposed outwardly of said plane substantially equal to the volume of said recess disposed inwardly of said plane and the laterally outer sides thereof spaced to provide substantail clearance with the sides of the groove of the body, said supporting face being seatingly engageable with the part-engaging surface of the grooved body for positioning said side sections within the groove and said recess outside of the groove in fixed relationship to the plane of the part-engaging surface of the grooved body; and means for injecting packing material in a plastic state into the cavity formed by the forming face and the groove.

11. Apparatus for forming a resilient deformable packing member in a grooved body to have an engaging portion extending beyond the part-engaging surface of said body but deformable within said body, which comprises: a holder for holding said body rigidly in place with the grooved surface thereof exposed; a die having a supporting face and a forming face, said forming face having spaced side sections extending outwardly of the plane of said supporting face and a central concave recess extending inwardly of said plane, said side sections having a volume disposed outwardly of said plane substantially equal to the volume of said recess disposed inwardly of said plane and the laterally outer sides thereof spaced to provide substantial clearance with the sides of the groove of the body, said supporting face being seatingly engageable with the part-engaging surface of the grooved body for positioning said side sections within the groove and said recess outside of the groove in fixed relationship to the plane of the part-engaging surface of the grooved body, a portion of said die on one side of said forming face being recessed inwardly from said supporting face to form an opening into the cavity defined by the forming face and he groove; and means for injecting packing material in a plastic state and under pressure into said cavity through said opening.

References Cited in the file of this patent

UNITED STATES PATENTS

| 323,731 | Phillips | Aug. 4, 1885 |
| 494,402 | Walsh | Mar. 28, 1893 |
| 1,023,761 | Reynolds | Apr. 16, 1912 |
| 2,092,393 | Hewitt | Sept. 7, 1937 |
| 2,208,620 | Baisch | July 23, 1940 |
| 2,216,863 | Visman | Oct. 8, 1940 |
| 2,327,113 | Krotz | Aug. 17, 1943 |
| 2,402,114 | Le Clair | June 11, 1946 |
| 2,687,909 | Blackman et al. | Aug. 31, 1954 |

FOREIGN PATENTS

| 211,185 | Great Britain | 1924 |
| 634,312 | Great Britain | Mar. 15, 1950 |